(12) United States Patent
Benjamin et al.

(10) Patent No.: US 9,776,648 B2
(45) Date of Patent: Oct. 3, 2017

(54) EMERGENCY ACTION SYSTEM FOR USE WITH A LOCOMOTIVE

(71) Applicant: Railserve, Inc., Atlanta, GA (US)

(72) Inventors: Timothy J. Benjamin, Newnan, GA (US); John Roberts, Chicago, IL (US); Peter M. Bartek, Ledgewood, NJ (US)

(73) Assignee: Railserve, Inc., Atlanta, GA (US)

( * ) Notice: Subject to any disclaimer, the term of this patent is extended or adjusted under 35 U.S.C. 154(b) by 0 days.

(21) Appl. No.: 15/191,198

(22) Filed: Jun. 23, 2016

(65) Prior Publication Data

US 2016/0311451 A1 Oct. 27, 2016

Related U.S. Application Data

(63) Continuation of application No. 15/133,935, filed on Apr. 20, 2016.

(Continued)

(51) Int. Cl.
*B61L 23/00* (2006.01)
*B61H 13/00* (2006.01)
(Continued)

(52) U.S. Cl.
CPC ............... *B61L 23/00* (2013.01); *B60T 7/22* (2013.01); *B61H 13/00* (2013.01); *B61L 15/009* (2013.01); *B61L 17/00* (2013.01); *B61L 23/041* (2013.01); *B61L 23/34* (2013.01); *B61L 25/021* (2013.01); *B61L 25/025* (2013.01); *B61L 27/04* (2013.01); *G01S 7/003* (2013.01); *G01S 13/931* (2013.01);
(Continued)

(58) Field of Classification Search
CPC ...... B60T 13/665; B60T 17/228; B60T 17/20; B60T 2201/022; B60T 7/22; B61L 23/041; B61L 23/14; B61L 23/06; B61L 25/025; B61L 27/0005; B61L 15/009; B61L 17/00; B61L 23/00; B61L 23/34; B61L 25/021; B61L 27/04; B61H 13/00; G01S 13/931; G01S 17/936; G01S 2013/9328; G01S 2013/9353; G01S 7/003; G01S 7/04
See application file for complete search history.

(56) References Cited

U.S. PATENT DOCUMENTS 6,323,785 B1 * 11/2001 Nickell .................. B61L 23/06
246/292
6,573,832 B1 * 6/2003 Fugere-Ramirez .... G08B 21/24
340/539.13

(Continued)

Primary Examiner — Mark Le
(74) Attorney, Agent, or Firm — Banner & Witcoff, Ltd.

(57) ABSTRACT

An anti-collision system for railcars and locomotives and, more particularly, to a distance ranging and worker coupling protection system utilizes remote-sensing radar techniques for use with a locomotive and railcar. The anti-collision system may include an object detector device attached to a railcar or a locomotive that detects objects in a path of the railcar and the locomotive and a train display device electrically connected to the object detector device. The anti-collision system may also include an emergency action device which enables a crew member to stop the railcar or locomotive without communication to a locomotive operator when a hazard is recognized. The object detector device may include a remote sensor, a radio, and a microprocessor programmed to include data-logging to record and log all data from the anti-collision system.

18 Claims, 4 Drawing Sheets

Related U.S. Application Data

(60) Provisional application No. 62/150,682, filed on Apr. 21, 2015.

(51) Int. Cl.
  *B61L 27/04* (2006.01)
  *B61L 15/00* (2006.01)
  *B61L 25/02* (2006.01)
  *G01S 13/93* (2006.01)
  *B60T 7/22* (2006.01)
  *B61L 17/00* (2006.01)
  *B61L 23/04* (2006.01)
  *B61L 23/34* (2006.01)
  *G01S 7/00* (2006.01)
  *G01S 17/93* (2006.01)
  *G01S 7/04* (2006.01)

(52) U.S. Cl.
  CPC ........... *B60T 2201/022* (2013.01); *G01S 7/04* (2013.01); *G01S 17/936* (2013.01); *G01S 2013/9328* (2013.01); *G01S 2013/9353* (2013.01)

(56) References Cited

U.S. PATENT DOCUMENTS

| | | | |
|---|---|---|---|
| 9,212,038 B1* | 12/2015 | Presti | B66F 11/042 |
| 9,434,397 B2* | 9/2016 | Chung | B61L 25/025 |
| 2002/0036428 A1* | 3/2002 | Jacob | B60T 13/263 |
| | | | 303/9.73 |
| 2008/0297900 A1* | 12/2008 | Rennick | A45F 5/02 |
| | | | 359/515 |
| 2009/0248223 A1* | 10/2009 | Ecton | G08C 23/04 |
| | | | 701/2 |

\* cited by examiner

EMERGENCY ACTION SYSTEM FOR USE WITH A LOCOMOTIVE

The application is a continuation application to U.S. Non-Provisional application Ser. No. 15/133,935, filed Apr. 20, 2016, which claims priority from U.S. Provisional Application Ser. No. 62/150,682, filed Apr. 21, 2015, which is herein incorporated by reference in its entirety.

FIELD OF THE INVENTION

The present invention relates to railcars and, more particularly, to a distance ranging and worker coupling protection system utilizing remote-sensing radar techniques for use with a locomotive and railcar.

BACKGROUND

A rail yard, railway yard or railroad yard is a complex series of railroad tracks for storing, sorting, or loading/unloading, railroad cars and/or locomotives. Railroad yards have many tracks in parallel for keeping rolling stock stored off the mainline, so that they do not obstruct the flow of traffic. Railroad cars are moved around by specially designed yard switchers, a type of locomotive. Cars in a railroad yard may be sorted by numerous categories, including Railroad Company, loaded or unloaded, destination, car type, or whether they need repairs. Railroad yards are normally built where there is a need to store cars while they are not being loaded or unloaded, or are waiting to be assembled into trains. Large yards may have a tower to control operations.

Many railway yards are located at strategic points on a main line. Main line yards are often composed of an Up yard and a Down yard, linked to the associated railroad direction. There are different types of yards, and different parts within a yard, depending on how they are built.

In all railway yards, a very dangerous action is performed when bringing railcars together and or apart. This action may be called a Shove Move which is the process of pushing a cut of cars or pushing a train from the rear and then coupling the cars together. Coupling utilizes a device located at both ends of all cars in a standard location to provide a means for connecting one railcar to another. A switching crew uses the locomotive to couple to and uncouple from railcars. The switching crew must communicate by radio, as the engineer in the cab of the locomotive usually cannot see where a long cut of cars is going, and relies on the crew member on the ground guiding them into position.

In these situations, there is always an opportunity for human error whenever a significant amount of verbal communication is required, and this will sometimes result in damage to person or property. The danger is that the locomotive engineer has no idea when the cars are being shoved or coupled without the assistance of ground personnel. Because of the danger of the shove and coupling move, the locomotive engineer also has no idea of the impact speed and the distance of the railcar. If the impact speed or distance is improperly determined by the locomotive engineer or ground personnel, the impact and coupling can cause damage to thousands of freight cars and millions of dollars of damage to couplers. In several cases, these accidents can cause injuries and even death to employees.

An objective standard to determine whether the railcars are moved safely is a desirable check to make sure the crew will not be impacting anything other than the next railcar targeted for coupling. A need exists for having equipment that will prevent the crew from continuing a move at an unsafe speed or direction and would prevent damage to person or property.

Figure 1:
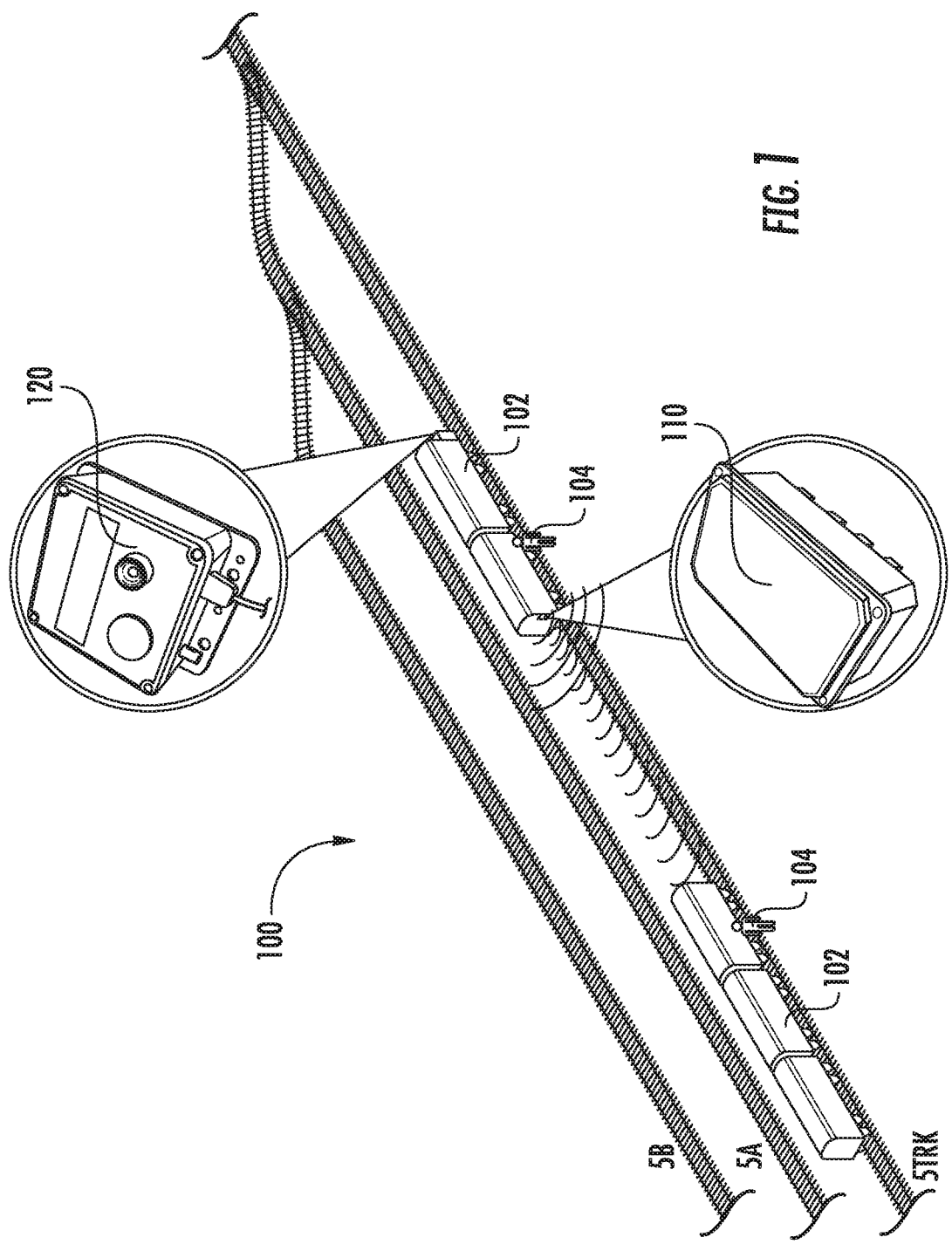
FIG. 1 is an overhead perspective view of an anti-collision system within a railyard in accordance with an embodiment of the system of the present invention.

The reader is advised that the attached drawings are not necessarily drawn to scale.

SUMMARY OF INVENTION

In one embodiment in accordance with aspects of the disclosure, an anti-collision system for use with a railcar is disclosed. The anti-collision system may include an object detector device attached to a railcar or a locomotive a train display device electrically connected to the object detector device. The object detector device may detect objects in a path of the railcar and the locomotive. The object detector device may include a remote sensor, a radio, and a microprocessor programmed to include data-logging to record and log all data from the anti-collision system. The train display device may include a screen and a horn. The screen may display one or more of a separation distances between the railcar and the locomotive, objects, and a speed of the railcar or locomotive. The horn may be activated when the object detector device detects objects in the path of the railcar and the locomotive. The radio may transmit train information between the object detector device and the train display device. The remote sensor may include an object-detection system to determine one or more of the following: a range, an altitude, a direction, or a speed of objects.

In another embodiment in accordance with aspects of the disclosure, method of an anti-collision system is disclosed. The method may include one or more of the steps of: 1) attaching an object detector device to a locomotive or a railcar, the object detector device including a remote sensor, a radio, and a microprocessor programmed to include data-logging to record and log all data from the anti-collision system; 2) emplacing a train display device in a cab of the locomotive, the train display device including an antenna for communication with the object detector device; 3) detecting, from the remote sensor of the object detector device, movements of the locomotive through a rail yard to include a speed of the locomotive and objects in a path of the locomotive to ensure there is safe movement of the locomotive; 4) if actions are proper and no object are detected as unsafe, no warnings will occur; 5) if actions are not proper and an unsafe movement begins to occur, detecting, from the remote sensor and the object detector device, the unsafe movement, and communicating to the train display device; 6) sending, by the train display device, a warning to a locomotive operator; and if the locomotive operator does nothing to stop the unsafe movement, sending, by the train display device, a signal to activate an emergency action system which will immediately stop the locomotive.

In yet another embodiment in accordance with aspects of the disclosure, an anti-collision system for use with a railcar or a locomotive is disclosed. The anti-collision system may include an object detector device attached to a railcar or a locomotive, a train display device electrically connected to the object detector device, and an emergency action device which enables a crew member to stop the railcar or locomotive without communication to a locomotive operator when a hazard is recognized. The object detector device may detect objects in a path of the railcar and the locomotive. The object detector device may include a remote sensor, a radio, and a microprocessor programmed to include data-logging to record and log all data from the anti-collision system. The train display device may include a screen and a horn. The screen may display one or more of a separation distances between the railcar and the locomotive, objects, and a speed of the railcar or locomotive. The horn may be activated when the object detector device detects objects in the path of the railcar and the locomotive. The emergency action device may include a transmitter with an emergency stop button and a locomotive transceiver located within a cabin of the locomotive. The locomotive transceiver may receive a signal sent from the transmitter and may further send an emergency stop signal to a set of brakes on the locomotive to stop. The radio may transmit train information between the object detector device and the train display device. The remote sensor may include an object-detection system to determine one or more of the following: a range, an altitude, a direction, or a speed of objects.

The details of these and other embodiments of the present invention are set forth in the accompanying drawings and the descriptions below. Other features and advantages of the invention will be apparent from the description and the drawings.

DETAILED DESCRIPTION OF EMBODIMENTS

Figure 2:
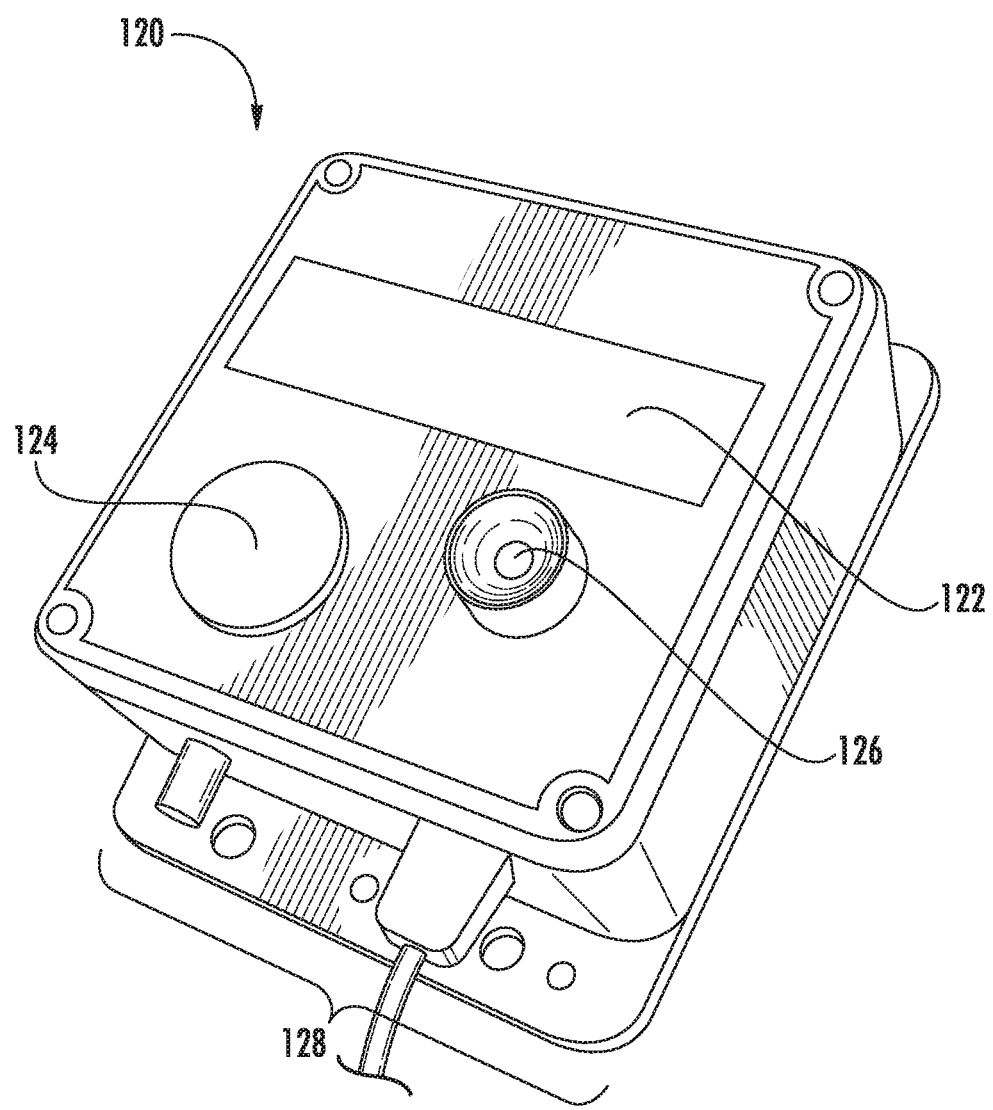
FIG. 2 is a front perspective view of a train display device from the anti-collision system illustrated in FIG. 1 in accordance with an embodiment of the system of the present invention.
Figure 3:
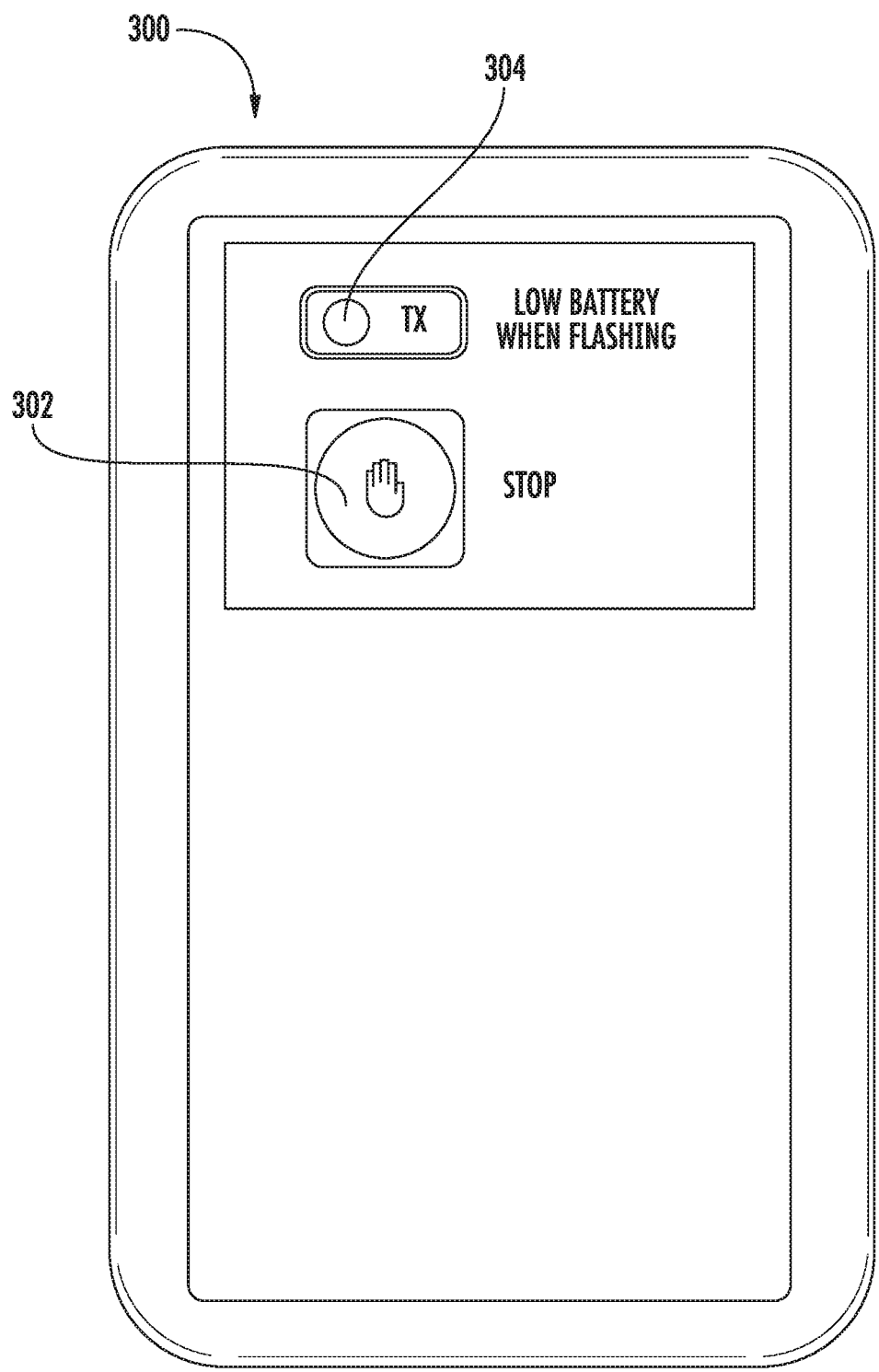
FIG. 3 is a front view of an emergency action device for use with the anti-collision system illustrated in FIG. 1 in accordance with an embodiment of the system of the present invention.

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.
Anti-Collision System FIGS. 1 through 3 illustrate an anti-collision system 100. The anti-collision system 100 may include a distance ranging and working coupling protection system utilizing remote-sensing techniques. The anti-collision system 100 may include remote-sensing techniques, such as radar technologies, that will be located on the end of the train or railcar 102. The remote-sensing techniques are designed to see an object in the path, and ultimately require the locomotive operator 104 to change his/her behavior, or the anti-collision system 100 will automatically stop the train. For example, the anti-collision system 100 may be programmed to allow coupling at 2 MPH. If the locomotive operator 104 gets within 250 feet of a coupling and is travelling at a speed greater than 2 MPH, the anti-collision system 100 will send a signal to the locomotive operator 104 to slow down. If the locomotive operator 104 does not slow down at 150-200 feet, the anti-collision system 100 may active an emergency action system (as will be explained below) and the train 102 will come to a stop. The anti-collision system 100 will also detect railcars 102 that are fouling a track. The anti-collision system 100 will also read derail devices that are in the "on" position, as well as a switch that is not lined for the correct route.

As illustrated in FIGS. 1 through 3, the anti-collision system 100 may include a portable object detector device 110 and a train display device 120. Generally, the portable object detector device 110 may attach to a railcar 102, detect objects in the path of the railcar 102, and transmit a warning through the train display device 120 to the locomotive operator 104 when an unwanted object is in the path of the railcar 102 during movement in a rail yard. The portable object detector device 110 may attach or be mountable to a locomotive or railcar 102 in various mechanical means. For example, the portable object detector device 110 may include various magnets or magnetic arrays to magnetically attach the portable object detector device 110 to the locomotive or railcar 102. Additionally, portable object detector device 110 may utilize other mechanical coupling means, such as straps, snaps, clips, screw fasteners, and any other mechanical coupling means without departing from this invention.

The portable object detector device 110 may include a remote sensor, such as a radar, a 900 MHz radio, and a microprocessor. The radio may be 900 MHz or other frequencies without departing from this invention. The radio may include an antenna on the portable object detector device 110 to transmit the information to the train display device. The information that is transmitted between the portable object detector device 110 and the train display device 120 is speed, direction, distance and the type of object. The radio may be in both the train display device 120 and the portable object detector device 110. The purpose of the radio is to transmit data from the portable object detector device 110 to the train display device 120.

The portable object detector device 110 may utilize a remote sensor. The remote sensor utilized with the portable object detector device 110 may include radar, an object-detection system that uses radio waves to determine the range, altitude, direction, or speed of objects. The radar dish or antenna transmits pulses of radio waves or microwaves that bounce off any object in their path. The object returns a tiny part of the wave's energy to a dish or antenna that is usually located at the same site as the transmitter. Other systems similar to radar may be utilized with the anti-collision system and make use of other parts of the electromagnetic spectrum. One example is "LIDAR'", which uses ultraviolet, visible, or near infrared light from lasers rather than radio waves. LIDAR (also known as LiDAR or LADAR) is a remote sensing technology that measures distance by illuminating a target with a laser and analyzing the reflected light. Other systems may be utilized if appropriate, such as RFID, ultrasonic, lasers, etc.

The portable object detector device 110 may also include a microprocessor as well as data storage capabilities. The microprocessor may be programmed to include data logging features as well and to record and log any and all data from the anti-collision system. The data logged may then be uploaded to be analyzed and reviewed as needed and required. The portable object detector device 110 may be capable of providing accurate sensing systems for the coupling of railcars on straight or curved tracks. The portable object detector device 110 may be able to provide the distinction between objects. The portable object detector device 110 may also be able to provide the distinction between objects in sideswipe avoidance, tangent track situations, derails, and couplings.

When a specific object is detected based on the special programmed software, the portable object detector device 110 determines how far the object is away from the railcar 102 and informs the operator 104 via the radio of the type of object, distance, and speed. The portable object detector device 110 transmits this information to the train display device 120. The portable object detector device 110 can detect objects and minimize the coupling impact between two freight cars or railcars or the locomotive and a freight car.

The portable object detector device 110 can also detect if a derail is in an open or closed position. A reflector may be secured or attached to the top of any derail to assist with detecting if a derail is in an open or closed position. The reflector may be an approximate 4 inch square or other sizes without departing from this invention. With the reflector attached to the top of the derail, the portable object detector device 110 may detect if the derail is in the open or closed position and communicate that information to the train display device 120 for the locomotive operator 104 to see.

Additionally, when the locomotive 102 is backing up or moving towards another railcar to couple to the other railcar 102, and any large object is shown outside the perimeters of the path, the portable object detector device 110 will detect this object and transmit a warning to train display device 120 and the locomotive operator 104. The large unwanted object may be based on size, location, or distance.

Additionally, the portable object detector device 110 may include a global positioning system (GPS). In certain situations when the coupling of the locomotive 102 and/or another railcar 102 occurs at a low enough speed (i.e. 2 MPH or lower), the locomotive 102 could keep shoving as the couple is below the threshold and the portable object detector device 110 may never sound the alarm. The GPS may help to indicate the continued movement of the locomotive. The GPS may be located on the portable object detector device 110 or within the portable object detector device 110. The GPS may also be integrated directly into the portable object detector device 110. The GPS may be located such that if a distance between the two objects stops decreasing, but the GPS indicates movement, then the locomotive 102 must be shoving something that the locomotive 102 coupled into further than desired. A pre-determined distance may be established (for example 10 feet), and if the GPS indicates that the locomotive or the portable object detector device 110 has traveled that far, but the distance from the portable object detector device 110 is not decreasing, then the portable object detector device 110 will alarm and activate the horn 124 as explained further below.

The anti-collision system 100 includes a train display device 120. The train display device 120 may include an LCD display 122, a horn or audible alarm 124, and a horn silence button 126. The train display device may include various connections 128, such as a power connector, a data connection, and other various connections without departing from this invention. The LCD display 122 may display separation distances, objects, and speed. The LCD display 122 may be customizable by software and/or programming to display other features and other information as recognized as pertinent to the locomotive operator. The horn 124 may begin beeping at a certain distance, such as at 25 feet separation between objects and coupling. The horn 124 may speed up until a solid tone at another distance, such as 5 feet. The horn silence button 126 may be pressed by the locomotive operator to silence the horn.

Additionally, the anti-collision system 100 may include an automatic stop as will be explained below with the emergency action system. If the anti-collision system 100 sees or detects an imminent danger and the proper action is not taken manually, the anti-collision system 100 may automatically stop the locomotive 102 through the use of the emergency action system.

Generally, as illustrated in FIG. 1, the steps for the operation of the anti-collision system 100 may include an operator 104 attaching the portable object detector device 110 to a locomotive or railcar 102. The operator 104 may then take the train display device 120 to the locomotive cab and emplace a radio antenna for communication with the portable object detector device 110. Once the portable object detector device 110 and the train display device 120 are emplaced properly, the operator 104 will ensure there is communication between the portable object detector device 110 and train display device 120. The operator 104 will then begin the movement of the locomotive 102 through the rail yard and complete whatever coupling or movements are required. During the movements, the portable object detector device 110 will be detecting the speed of the locomotive 102, as well as all objects in the path of the locomotive 102 to ensure there is safe movement throughout the movement of the locomotive 102. If all actions are proper and no objects are detected as unsafe, no warnings will occur. If actions are not proper and an unsafe movement begins to occur, the portable object detector device 110 will detect this unsafe situation and communicate to the train display device 120. The train display device 120 will then send a warning to the locomotive operator 104. If the locomotive operator 104 does nothing to stop the unsafe movement, the train display device 120 may send a signal to activate the emergency action system and immediately stop the movement of the locomotive 102. If the emergency action system is activated, the locomotive 102 will come to a complete stop. After the emergency action system is activated, the locomotive operator 104 will need to press the reset button 302 on the emergency action device 300 to reset the emergency action system to resume movement once the unsafe situation is corrected. Once the movements are complete, the locomotive operator 104 will remove the portable object detector device 110 from the given locomotive or railcar 102 and move the portable object detector device 110 to the next required locomotive or railcar 102 and repeat this process.

Emergency Action System

Additionally, the anti-collision system may include an emergency action system. The emergency action system may be designed to provide crew members who work the ground emergency stop protection should they observe a situation that is determined to be unsafe if the move continues.

As illustrated in FIG. 3, the emergency action system includes an emergency action device 300. The emergency action system and emergency action device 300 is a safety device utilized at rail operations. The emergency action system enables crew members to stop a train or railcar without communication to the locomotive operator when a hazard is recognized. Circumstances can suddenly arise, such as when a vehicle crosses in front of an approaching train, or where the locomotive operator might not be able to see what the crew member on the ground is viewing. The emergency action system can provide life-saving seconds in the event that there is a loss of radio contact, a vehicle encroaches the train at a grade crossing, or a close clearance suddenly appears.

As illustrated in FIG. 3, the emergency action system may include an emergency action device 300. The emergency action device 300 may be worn on a reflective safety vest. The emergency action device 300 may include an emergency stop button 302. The emergency action device 300 may also include a low battery level indicator light 304. The low battery level indicator light 304 may lights up when the battery level on the emergency action device 300 is low. Additionally, the emergency action system may include a locomotive transceiver. The locomotive transceiver may be located within the locomotive cabin. The locomotive transceiver may be configured to receive a signal sent from the transmitter remote and send a signal to the locomotive brakes or air lines.

The emergency brake application may be achieved when the crew member activates the emergency stop button on the emergency action device that is worn on their reflective safety vest. Once the emergency stop button 302 is pressed and activated, a signal is sent to the locomotive to bring the train to an emergency stop. The signal may be sent to the locomotive and specifically a relay valve causing air to be released from the brake pipe and putting the locomotive into emergency stop, thereby immediately applying the brakes and bringing the train to an immediate stop. The emergency application cannot be reset until the crew member pushes the emergency stop button 302 sending another signal closing the relay valve and indicating that the hazard has been resolved.

The time lag from the moment a crew member recognizes a hazard to getting the radio in hand, opening communications, actually speaking a clear instruction, and for the train to come to a stop can take several valuable seconds—enough time for a train to move a hundred feet or more. Experience with emergency action system has shown that the emergency stop can be accomplished in as little as a half car-length, or about 26 feet. That shorter stopping distance can mean the difference between a miss or a collision, and reduce the risk of personal injury or even death.

Additionally, the anti-collision system 100 may include a global position system (GPS). First, the GPS may be utilized on the portable object detection device 110 in the situation when an operator forgets to remove the portable object detection device 110 from the locomotive or railcar 102. In this instance, the portable object detection device may be found utilizing the GPS. The GPS may also be equipped on an individual locomotive 102. The GPS may be LAT-LON GPS. In addition to equipping each individual locomotive 102 with GPS, the railcars may also be equipped with GPS. There are many safety advantages associated with the use of GPS on locomotives in combination with the anti-collision system, such as:

Real-time notification if the speed of a locomotive exceeds a certain threshold, such as 7 MPH.

Real-time notification if a locomotive impact exceeds a certain threshold, such as greater than 1 G (4 MPH coupling or more).

Throttle control, brake application, and emergency action system utilization.

Gives the management the ability to monitor rail yard operations during 24 hours instead of just during traditional points in time observations performed as spot checks.

Knowing if the move is continuing after a coupling at safe speed.

An embodiment for transmitting and receiving the data collected by the anti-collision system 100 described above is provided in FIG. 4. It should be noted that the term "remote" as used herein means any location that is not on-board the railcar 102. Such a location may be next to the railcar, such as in a rail yard, or a location that is cross country with respect to the location of the railcar.

Figure 4:
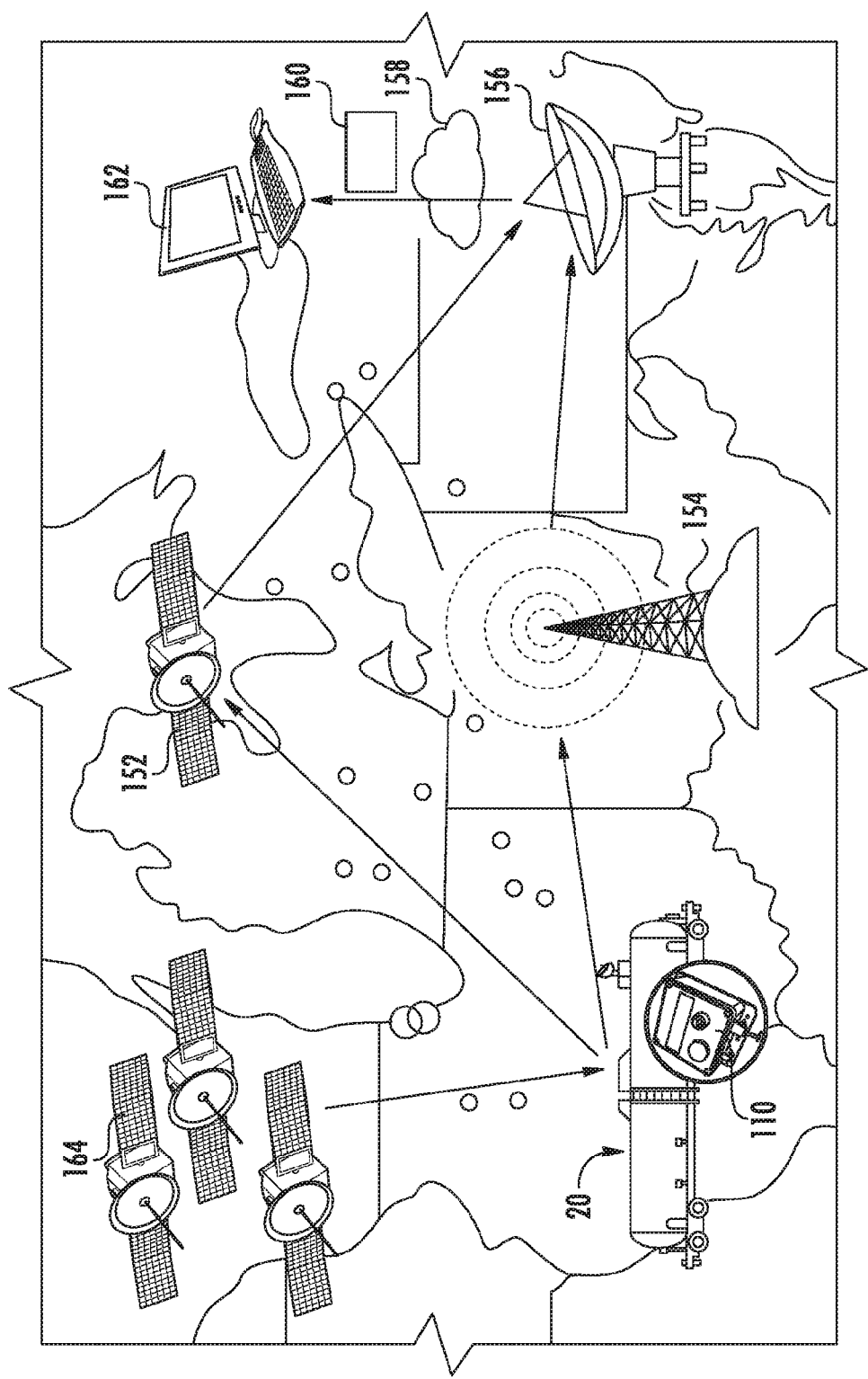
FIG. 4 is a flow diagram illustrating the data transmission and reception components in accordance with an embodiment of the system of the present invention.

As illustrated in FIG. 4, the data from the anti-collision system 100 may be transmitted to a geo-stationary communications satellite 152 and/or a cellular system 154 to one or more remote receiving station(s) 156. The receiving station 156 transmits the data via the Internet 158 to a web based portal 160 which is accessible by a user via a workstation 162. Data collected and transmitted can be from any anti-collision system 100. Location data may be generated by Global Positioning System (GPS) satellite technology 164. As was described above, the anti-collision system 100 may feature a number of additional data collection outputs, such as speed, direction, distance and the type of object. Outputs from all of the data from the anti-collision system 100 may be combined together to electronically represent the status or condition.

In an embodiment of the system, wireless sensors located at various locations throughout a rail yard may be set up in a wireless network with each sensor (node) having its own power source and transceiver. The nodes can communicate with other nodes and determine the best path of communication and minimize power requirements to reach the safest operation throughout the rail yard.

The anti-collision system 100 may include a receiver/CPU and a GPS transponder which interacts with the U.S. Federal location satellites. This feature gives location, altitude, speed and other features offered by conventional GPS capabilities. The GPS and sensor data is then transmitted via a modem in the specified form of transmission along with the remaining railcar anti-collision data. Once the data is received by the end user, the data can be further combined for additional value. A preferred method to add value to data generated by the system is by associating the location data (GPS) with information stored in the on-board memory of microprocessors in the anti-collision system 100.

Once data is received by the end user (such as receiving station 156 or portal 160 in FIG. 4), it is loaded into a website or computer based software program capable of sorting, running calculations, manipulating and displaying data in formats that benefit the end user. The software may include a website which can display and run calculations to provide the needed information for the end user.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

We claim:

1. An emergency action device for use with a railcar or a locomotive, the apparatus comprising:
    a user-based emergency action device transmitter with an emergency stop button;
    a locomotive transceiver in communication with the emergency action device transmitter and located on a locomotive; and
    a train display device configured to send a warning to a locomotive operator, and to send a signal to activate the emergency action device to immediately stop the locomotive if a locomotive operator fails to response to the warning to stop an unsafe movement of the locomotive,
    wherein the locomotive transceiver receives a signal sent from the emergency action device transmitter when a crew member on the ground presses the emergency stop button, and the locomotive transceiver further sends an emergency stop signal to a set of brakes on the locomotive to stop, wherein the emergency stop signal is sent to a relay valve causing air to be released from a brake pipe, thereby immediately applying the set of brakes and bringing the locomotive to an immediate stop, and further wherein the emergency action device is reset only when the crew member pushes the emergency stop button a second time, which sends a reset signal closing the relay valve and releasing the set of brakes, indicating that the hazard has been resolved, wherein the locomotive transceiver and the relay valve are configured to be responsive to and in communication with the emergency action device transmitter, wherein the emergency action device transmitter and the locomotive transceiver enables the crew member on the ground to stop the railcar or locomotive without communication to a locomotive operator when a hazard is recognized.

2. The emergency action device of claim 1, wherein the transmitter is attached to a reflective safety vest.

3. The emergency action device of claim 1, further including a low battery level indicator light that lights up when a battery level on the emergency action device is low.

4. The emergency action device of claim 1, wherein the locomotive transceiver is located within a cabin of the locomotive.

5. The emergency action device of claim 1, wherein the emergency action device transmitter is in communication with an object detector device attached to a locomotive or a railcar.

6. The emergency action device of claim 5, wherein the object detector device includes a remote sensor, a radio, and a microprocessor programmed to include data-logging.

7. The emergency action device of claim 6, wherein the remote sensor of the object detector device detects movements of the locomotive through a rail yard to include a speed of the locomotive and objects in a path of the locomotive to ensure there is safe movement of the locomotive.

8. An emergency action system for use with a railcar or a locomotive, the system comprising:
    a user-based emergency action device that includes a transmitter and an emergency stop button;
    a locomotive transceiver in communication with the transmitter and located on a locomotive; and
    a train display device configured to send a warning to a locomotive operator, and to send a signal to activate the emergency action device to immediately stop the locomotive if a locomotive operator fails to response to the warning to stop an unsafe movement of the locomotive,
    wherein the locomotive transceiver receives a signal sent from the emergency action device when a crew member presses the emergency stop button, and the locomotive transceiver further sends an emergency stop signal to a set of brakes on the locomotive to stop, wherein the transmitter and the locomotive transceiver enables the crew member to stop the railcar or locomotive without communication to the locomotive operator when a hazard is recognized, and further wherein the emergency stop signal is sent to a relay valve causing air to be released from a brake pipe, thereby immediately applying the set of brakes and bringing the locomotive to an immediate stop, wherein the locomotive transceiver and the relay valve are configured to be responsive to and in communication with the emergency action device transmitter.

9. The emergency action system of claim 8, wherein the emergency action device is reset only when the crew member pushes the emergency stop button a second time, which sends a reset signal closing the relay valve and releasing the set of brakes, indicating that the hazard has been resolved.

10. The emergency action system of claim 8, wherein the emergency action device is attached to a reflective safety vest.

11. The emergency action system of claim 8, further including a low battery level indicator light that lights up when a battery level on the emergency action device is low.

12. The emergency action system of claim 8, wherein the locomotive transceiver is located within a cabin of the locomotive.

13. The emergency action system of claim 8, wherein the emergency action device is in communication with an object detector device attached to a locomotive or a railcar, wherein the object detector device includes a remote sensor, a radio, and a microprocessor programmed to include data-logging.

14. The emergency action system of claim 13, wherein the remote sensor of the object detector device detects movements of the locomotive through a rail yard to include a speed of the locomotive and objects in a path of the locomotive to ensure there is safe movement of the locomotive.

15. A method including:
    attaching a user based emergency action device to a crew member, the emergency action device including a transmitter and an emergency stop button;
    providing a train display device configured to send a warning to a locomotive operator, and to send a signal to activate the emergency action device to immediately stop the locomotive if a locomotive operator fails to response to the warning to stop an unsafe movement of the locomotive;
    when a hazard is recognized, pressing, by the crew member, the emergency stop button and the transmitter sending a signal to a locomotive transceiver in communication with the transmitter, wherein the locomotive transceiver is configured to be responsive to and in communication with the emergency action device and the transmitter, wherein the locomotive transceiver is located in a cab of a locomotive;

sending, by the locomotive transceiver, an emergency stop signal to a set of brakes on the locomotive to stop, wherein the transmitter and transceiver enables the crew member to stop the railcar or locomotive without communication to a locomotive operator when a hazard is recognized;

opening a relay valve to release air from a brake pipe, and thereby applying the set of brakes and bringing the locomotive to an immediate stop; and resetting the emergency action device only when the crew member pushes the emergency stop button a second time, which sends a reset signal closing the relay valve and releasing the set of brakes, indicating that the hazard has been resolved.

16. The method of claim 15, wherein the emergency action device is attached to a reflective safety vest.

17. The method of claim 15, the emergency action device further including a low battery level indicator light that lights up when a battery level on the emergency action device is low.

18. The method of claim 15, wherein the locomotive transceiver is located within a cabin of the locomotive.

* * * * *